(12) United States Patent
Tong

(10) Patent No.: US 7,889,128 B2
(45) Date of Patent: Feb. 15, 2011

(54) ARRAY ANTENNA APPARATUS AND SIGNAL PROCESSING METHOD

(75) Inventor: Fangwei Tong, Tokyo (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/280,773

(22) PCT Filed: Feb. 23, 2007

(86) PCT No.: PCT/JP2007/053415

§ 371 (c)(1),
(2), (4) Date: Dec. 5, 2008

(87) PCT Pub. No.: WO2007/097427

PCT Pub. Date: Aug. 30, 2007

(65) Prior Publication Data

US 2010/0013707 A1    Jan. 21, 2010

(30) Foreign Application Priority Data

Feb. 27, 2006    (JP) .............................. 2006-050006

(51) Int. Cl.
*H01Q 3/22* (2006.01)
(52) U.S. Cl. .................................................. 342/375
(58) Field of Classification Search ................. 342/368, 342/372, 375, 380, 382
See application file for complete search history.

(56) References Cited

U.S. PATENT DOCUMENTS

| | | | |
|---|---|---|---|
| 4,797,950 A * | 1/1989 | Rilling | 455/276.1 |
| 5,537,443 A | 7/1996 | Yoshino et al. | |
| 6,393,073 B1 * | 5/2002 | Eilts | 375/340 |
| 6,404,821 B1 | 6/2002 | Dent | |
| 6,590,528 B1 * | 7/2003 | DeWulf | 342/357.12 |
| 2002/0169578 A1 * | 11/2002 | Yang | 702/152 |
| 2004/0180627 A1 * | 9/2004 | Dabak et al. | 455/67.16 |

FOREIGN PATENT DOCUMENTS

| | | |
|---|---|---|
| JP | 2001-044903 | 2/2001 |
| JP | 2001-045081 | 2/2001 |
| JP | 2001-069053 | 3/2001 |
| JP | 2005-318318 | 11/2005 |

OTHER PUBLICATIONS

Korean language office action and its English language translation for corresponding Korean application 1020087020623 lists the reference above, Aug. 26, 2010.

* cited by examiner

*Primary Examiner*—Dao L Phan
(74) *Attorney, Agent, or Firm*—DLA Piper LLP (US)

(57) ABSTRACT

An array antenna apparatus which has an away antenna formed by a plurality of antenna elements, and subjects received signals, which are received by the antenna elements, to weighting using array weights of complex numbers. The array antenna apparatus includes a delay device for delaying a signal; a weighting device for separating ea of the received sirs into first and second received signals, delaying any one of the first and second received signals by using the delay device, so as to weight the first and second received signals at different timings; and a first adding device for adding the weighted first and second received signals to each other. The weighting device weights any one of the first and second received signals by using the real part of the relevant array weight, and weights the other received signal by using the imaginary part of the array weight.

8 Claims, 2 Drawing Sheets

ARRAY ANTENNA APPARATUS AND SIGNAL PROCESSING METHOD

TECHNICAL FIELD

The present invention relates to an array antenna apparatus and a signal processing method.

This application is a national stage of International Application No. PCT/JP2007/053415 filed Feb. 23, 2007, which also claims the benefit of priority under 35 USC 119 to Japanese Patent Application No. 2006-050006, filed Feb. 27, 2006, the entire contents of which are incorporated herein by reference.

BACKGROUND ART

Conventionally, an adaptive array antenna apparatus has an array antenna including a plurality of antenna elements. Based on a signal received by each antenna element and a known reference signal, array weights (complex numbers) for the antenna elements are adaptively computed, and the received signals of the antenna elements are subjected to weighting synthesis using the weight array of the complex numbers, thereby forming directivity of the array antenna.

For example, in the conventional technique disclosed in Patent Document 1, in order to install an adaptive array antenna to an existing wireless apparatus which does not employ an adaptive array antenna, the received signal having a radio frequency (RF)) of each antenna element is converted into a lower frequency (e.g., baseband frequency), and then subjected to weighting for the amplitude and phase thereof. After that the received signals of the antenna elements are synthesized, and the frequency of the synthesized signal is converted to a higher RF. The RF signal is then supplied to the existing wireless apparatus.

On the other hand, when in a known technique for synthesizing the received signals of the antenna elements into one signal, the received signal of each antenna element is separated into an in-phase element (I channel) and a quadrature element (Q channel), and the total sum of the signals of the antenna elements is independently computed for each of the T and Q channels (see, for example, FIG. 1 of Patent Document 2).

Patent Document 1: Japanese Unexamined Patent Application, First Publication No. 200149053.

Patent Document 2: Japanese Unexamined Patent Application, First Publication No. 2005-318318.

However, in the conventional technique disclosed in Patent Document 1, the received signal of each antenna element is converted to have a frequency (e.g., baseband) lower than the input frequency (e.g., RF) of the existing wireless apparatus, and then weighting synthesis of the signals is performed. Therefore, after the synthesis, the frequency of the relevant received signal should be again raised to the input frequency of the existing wireless apparatus. In this case, a frequency upconverter (e.g., a local signal generator or a mixer) is required. In addition, as a frequency up-converter such as a mixer performs non-linear processing, a signal distortion may occur during the processing.

Additionally, in the conventional technique disclosed in Patent Document 2, when synthesizing the received signals of the antenna elements, I and Q channels each require an adder.

As described above, in the conventional techniques, the system store may be complex, the manufacturing cost may increase, and the signal reception quality may degrade.

DISCLOSURE OF INVENTION

In light of the above circumstances, an object of the present invention is to provide an array antenna apparatus and a signal processing method, by which (i) no frequency conversion is necessary for installing an array antenna to an existing apparatus which employs no array antenna, and (ii) in an adder for synthesizing the received signals of the antenna elements, no complex-number operation is necessary.

In order to achieve the object, the present invention provides an array antenna apparatus which has an array antenna formed by a plurality of antenna elements, and subjects received signals, which are received by the antenna elements, to weighting using array weights of complex numbers, the array antenna apparatus comprising:

a delay device for delaying a signal;

a weighting device for separating each of the received signals into first and second received signals, delaying any one of the first and second received signals by using the delay device, so as to weight the first and second received signals at different timings; and a first adding device for adding the weighted first and second received signals to each other, wherein;

the weighting device weights any one of the first and second received signals by using the real part of the relevant array weight, and weights the other received signal by using the imaginary part of the array weight.

In a typical example, the army antenna apparatus further comprises a second adding device for adding the weighted signals corresponding to the antenna elements to each other.

In another typical example, the array antenna apparatus further comprises a sampling device for subjecting the received signal received by each of the antenna elements to sampling, so as to convert the received signal to a digital signal.

In this case, preferably, the delay device delays the relevant received signal by one sample time when the sampling frequency fs of the sampling device is defined by:

$$fs = 4 \times f0/(2m+1)$$

where m indicates a natural number, and f0 indicates the center frequency of the received signal.

The present invention also provides a signal processing method of subjecting received signals, which are received by a plurality of antenna elements which form an array antenna, to weighting using array weights of complex numbers, the method comprising the steps of:

separating each of the received signals into a first received signal and a second received signal which has been delayed in comparison with the first received signal, and weighting the first and second received signals at different timings; and adding the weighted first and second received signals to each other, wherein:

any one of the first and second received signals is weighted by using the real part of the relevant array weight, and the other received signal is weighted by using the imaginary part of the array weight.

In a typical example, the signal processing method further comprises the step of adding the weighted signals corresponding to the antenna elements to each other.

In another typical example, the signal processing method further comprises the step of subjecting the received signal received by each of the antenna elements to sampling, so as to convert the received signal to a digital signal.

In this case, preferably, between the different timings, there is a difference of one sample time when the sampling frequency fs of the sampling is defined by:

$$fs=4\times f0/(2m+1)$$

where m indicates a natural number, and f0 indicates the center frequency of the received signal.

In accordance with tire present invention, no frequency conversion is necessary for installing an array antenna to an existing apparatus which employs no array antenna. Additionally, in an adder for synthesizing the received signals of the antenna elements, no complex-number operation is necessary.

BEST MODE FOR CARRYING OUT THE TION

Below, an embodiment in accordance with the present invention will be explained with reference to the drawings. The present embodiment employs an adaptive array antenna apparatus using an Gray antenna apparatus.

Figure 1:
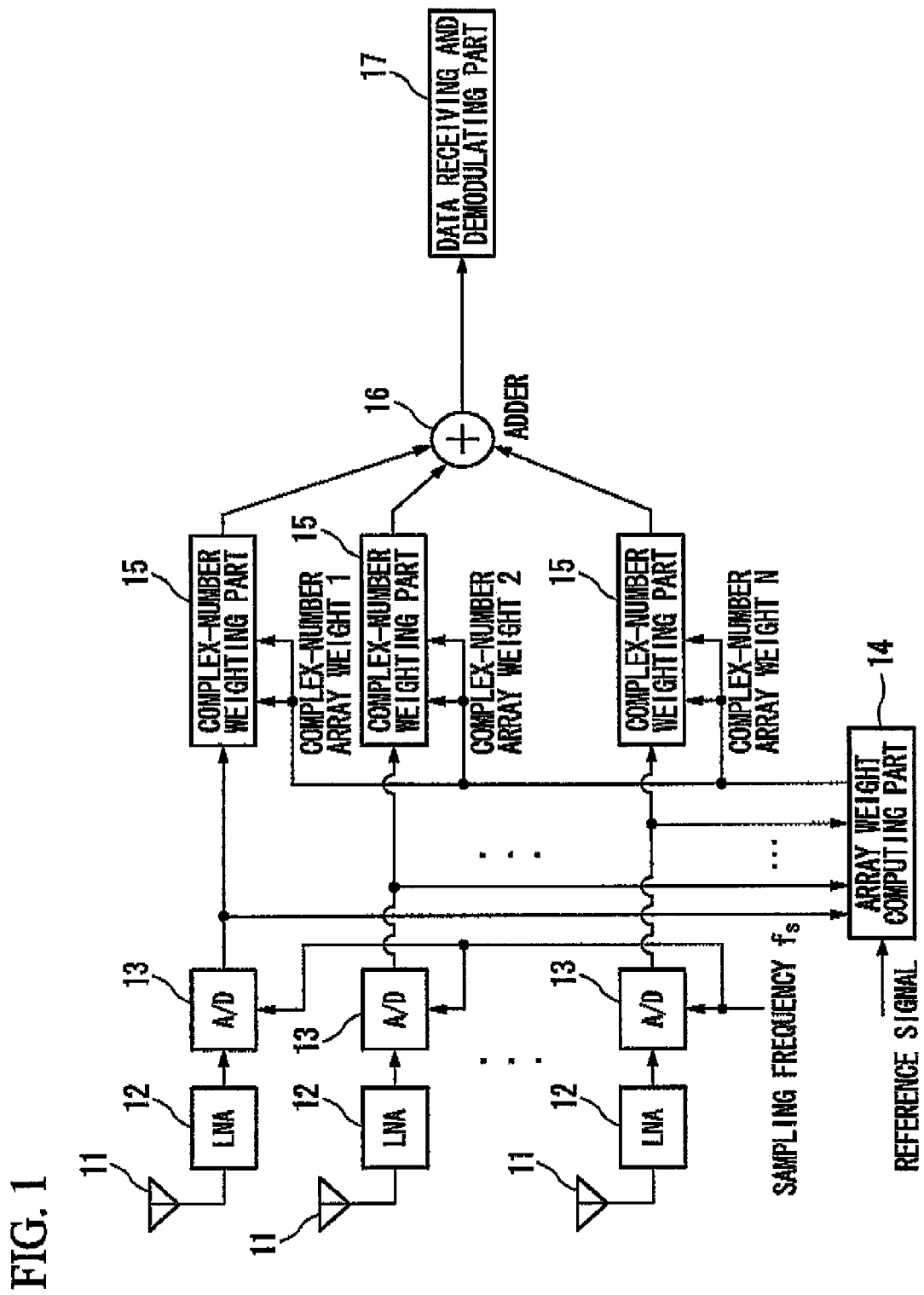
FIG. 1 is a block diagram showing the structure of an adaptive array antenna apparatus as an embodiment of the present invention.

FIG. 1 is a block diagram showing an adaptive array antenna apparatus as an embodiment of the present invention. In FIG. 1, a plurality of antenna elements 11 (here, N antenna elements) form an array antenna. The RE received signal received by each antenna element 11 is amplified by a low noise amplifier (LNA) 12, and then input into an analog-to-digital converter (A/D converter) 13.

The AD converter 13 subjects the RF received signal (output from the LNA 12) to sampling using a sampling frequency fs, so as to convert the signal to a digital signal. Accordingly, a digitized RF received signal (called an "RF digital received signal") is obtained.

Based on the RP digital received signal and a known reference signal, an array weight computing part 14 adaptively computes array weights 1 to N, which are complex numbers and correspond to the antenna elements 11.

The array weights 1 to N are input into complex-number weighting parts 15 corresponding to the antenna elements 11, where the real part and the imaginary part of each weight are separately input.

Each complex-number weighting pan 15 subjects the relevant RE received signal to weighting using the real part of the corresponding array weight and also to weighting using the imaginary part thereof, and the weighted signals are synthesized. The signal synthesized in each complex-number weighting part 15 is supplied to an adder 16 which adds the synthesized signals to each other. The signal after the addition is input into a data receiving and demodulating part 17.

That is, the received signals of the antenna elements 11 are weighted and synthesized while maintaining the original frequency (i.e., RE), and the synthesized signal is input as a digital signal into the data receiving and demodulating part 17. The data receiving and demodulating part 17 is an existing wireless reception apparatus, and converts the input RU received signal (after the weighting synthesis) into a baseband received signal, so as to demodulate the signal and obtain reception data.

Figure 2:
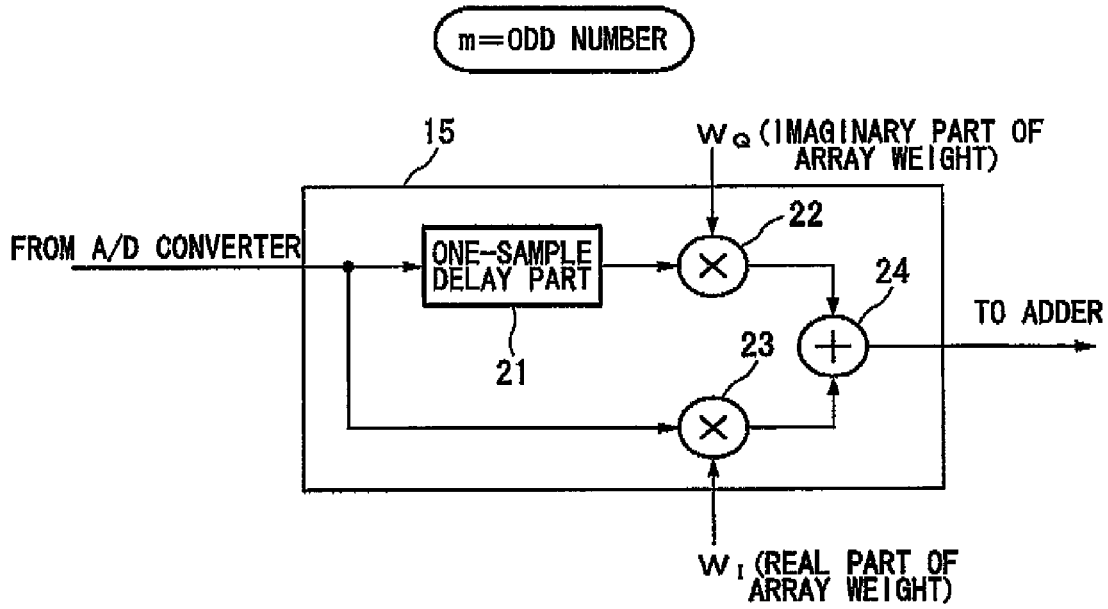
FIG. 2 is a block diagram showing the structure of a first example of each complex-number weighting part 15 in FIG. 1.
Figure 3:
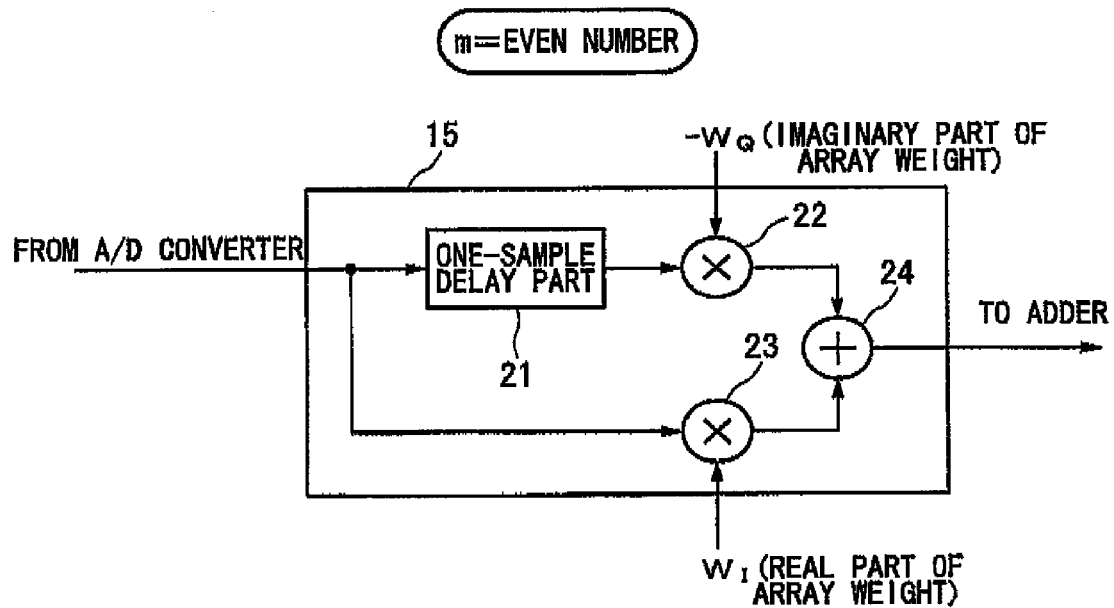
FIG. 3 is a block diagram showing the structure of a second example of each complex-number weighting part 15 in FIG. 1.

FIGS. 2 and 3 are block diagrams showing the structure of first and second examples of each complex-number weighting part 15 in FIG. 1.

In FIGS. 2 and 3, the complex-number weighting part 15 has a one-simple delay part 21, multipliers 2 and 23, and an adder 24. The difference between FIGS. 2 and 3 is only the sign applied to the imaginary part of the array weight which is used in the multiplication performed by the multiplier 22.

In FIG. 2, the one-sample delay part 21 delays the R digital received signal, which is output from the corresponding AD converter 13, by one sample tire of the relevant sampling frequency fs.

The multiplier 22 multiplies the delayed RF digital received signal by the imaginary part $W_Q$ of the relevant array weight in contrast the multiplier 23 multiplies the non-delayed RF digital received signal (output from the A/D converter 13) by the real part $W_I$ of the array weight.

The adder 24 adds the products of the multiplications 22 and 23 by the multipliers 22 and 23, and outputs the sum thereof.

FIG. 3 has a structure similar to FIG. 2. However, the multiplier 22 multiplies the delayed RF digital received signal by the imaginary part $W_Q$ of the relevant array weight, where $W_Q$ has the inverted sign. Instead of inverting the sign of the imaginary part $W_Q$ of the array weight, the sign of the RE digital received signal input into the multiplier 22 may be inverted.

The structures of FIGS. 2 and 3, which are distinctive parts of the present embodiment, will be explained in further detail.

In the present embodiment, the sampling frequency fs of the A/D converter 13 is represented by the following formula (1):

$$fs=4\times f0/(2m+1) \tag{1}$$

where f0 indicates the center frequency of the RV received signal output from the corresponding LNA 12, and m indicates a natural number.

For example, if f0=152.5 MHz and m=300, then the sampling frequency fs is computed by the formula (1) as follows:

$$fs=4\times 1502.5/(2\times 300+1)=10 \text{ MHz}$$

When selecting the sampling frequency fs (i.e., selecting m), it is necessary that the sampling frequency fs be twice or more as much as the bandwidth of the received signal.

For the sampling frequency fs, if m in the above formula (1) is an odd number, the structure of FIG. 2 is employed. In contrast, if m is an even number, the Structure of FIG. 3 is employed.

The following formulas (2) and (3) show relationships between the sampling frequency fs and the one-sample delay in the present embodiment.

The formula (2) indicates the received signal after the relevant sampling, and the formula (3) indicates the signal to which the one-sample delay was applied.

$$A(n\times Ts)\cos[2\pi\times f0\times n\times Ts+\phi(n\times Ts)] \tag{2}$$

$$A(n\times Ts-Ts)\cos\left[\begin{array}{l}2\pi\times f0\times (n-1)\times \\ Ts+\varphi(n\times Ts-Ts)\end{array}\right]= \tag{3}$$

-continued $$A(n \times Ts - Ts)\sin\begin{bmatrix} 2\pi \times f0 \times n \times Ts + \\ \varphi(n \times Ts - Ts) \end{bmatrix}$$

(when $m$ is an even number) $= -A(n \times Ts - Ts)$ $$\sin\begin{bmatrix} 2\pi \times f0 \times n \times Ts + \\ \varphi(n \times Ts - Ts) \end{bmatrix}$$ (when $m$ is an odd number)

where Ts indicates the sampling interval (Ts=1/fs=(2m+1)/(4×f0)), and n indicates the number of sampling times.

When variations in the amplitude component A(n×Ts) and the phase component φ(n×Ts) of the received signal are relatively small within the sampling interval Ts, then A(n×Ts−Ts) and φ(n×Ts−Ts) can be respectively approximated to A(n×Ts) and φ(n×Ts). Therefore, it is understood that the one-sample-delayed signal indicated by the formula (3) is an orthogonal signal of the signal indicated by the formula (2).

When using the sampling frequency fs defined by the formula (1), two signals perpendicular to each other can be obtained due to the one-sample temporal delay. Accordingly, there is an orthogonal relationship between the signal, which was one-sample-delayed by the one-sample delay part 21 in FIG. 2 or 3, and the non-delayed signal.

The non-delayed signal is subjected to the weighting, which is performed by the multiplier 23 and uses the real part of the relevant array weight. In contrast, the delayed signal is subjected to the weighting, which is performed by the multiplier 22 and uses the imaginary part of the array weight.

When m is an odd number (see FIG. 2), the multiplier 22 performs the weighting by directly applying the imaginary part of the array weight to the one-sample-delayed signal. In contrast, when m is an even number (see FIG. 3), the multiplier 22 performs the weighting by applying the imaginary part of the array weight, whose sign has been inverted, to the one-sample-delayed signal. This is because, as can be understood by the formula (3), the two signals perpendicular to each other have different signs in accordance with m, which is an odd or even number.

In accordance with the above-described present embodiment, the received signals can be subjected to weighting synthesis in a bandwidth such as an RF or IF (intermediate frequency) band, that is, at least higher than the baseband.

In addition, the weighted signal output from the weighting part 15 of FIG. 2 or 3 can be directly subjected to the addition of the signals of the antenna elements, without being separated into the real and imaginary parts.

Accordingly, when attaching an adaptive array antenna to an existing wireless apparatus which does not employ an adaptive array antenna, the received signals of the antenna elements can be subjected to weighting synthesis at the input frequency of the existing wireless apparatus. Therefore, it is unnecessary to perform frequency conversion for raising the frequency of the weighting-synthesized signal to the input frequency of the existing wireless apparatus. In addition, in the synthesis of the received signals of the antenna elements, no separation into the real and imaginary pats is necessary. Therefore, it is possible to reduce adders used for synthesizing signals.

The embodiment of the present invention has been explained with reference to the drawings. However, concrete structures are not limited to the embodiment, and design modifications or the like can be made without departing from the scope of the present invention.

For example, in the above-described embodiment, the present invention is applied to RE signals. However, the present invention can also be applied to IF signals converted from RF signals. In this case, if IF is 6 MHz and m=1, the sampling frequency fs is computed by substituting IF for f0 in the formula (1) with IF, as follows;

$Fs=4\times6(2\times1+1)=8$ MHz

Also in the above-described embodiment an adaptive array antenna is employed. However, the present invention can also be applied to an array antenna apparatus having fixed array weights.

INDUSTRIAL APPLICABILITY

It is possible to eliminate frequency conversion for installing an array antenna to an existing wireless apparatus which does not employ an array antenna, and no complex-number operation is necessary in an adder for synthesizing the received signals of the antenna elements.

The invention claimed is:

1. An array antenna apparatus which has an array antenna formed by a plurality of antenna elements, and subjects received signals, which are received by the antenna elements, to weighting using array weights of complex numbers, the array antenna apparatus comprising:
    a delay device for delaying a signal;
    a weighting device for separating each of the received signals into first and second received signals, delaying any one of the first and second received signals by using the delay device, so as to weight the first and second received signals at different timings; and
    a first adding device for adding the weighted first and second received signals to each other, wherein:
    the weighting device weights any one of the first and second received signals by using the real part of the relevant array weight, and weights the other received signal by using the imaginary part of the array weight.

2. The array antenna apparatus in accordance with claim 1, further comprising:
    a second adding device for adding the weighted signals corresponding to the antenna elements to each other.

3. The array antenna apparatus in accordance with claim 1, further comprising;
    a sampling device for subjecting the received signal received by each of the antenna elements to sampling, so as to convert the received signal to a digital signal.

4. The array antenna apparatus in accordance with claim 3, wherein:
    the delay device delays the relevant received signal by one sample time when the sampling frequency fs of the sampling device is defined by:

$fs=4\times f0(2m+1)$ where m indicates a natural number, and f0 indicates the center frequency of the received signal.

5. A signal processing method of subjecting received signals, which are received by a plurality of antenna elements which form an array antenna, to weighting using array weights of complex numbers, the method comprising the steps of:
    separating each of the received signals into a first received signal and a second received signal which has been delayed in comparison with the first received signal, and weighting the first and second received signals at different timings; and adding the weighted first and second received signals to each other, wherein:

any one of the first and second received signals is weighted by using the real part of the relevant array weight, and the other received signal is weighted by using the imaginary part of the array weight.

6. The signal processing method in accordance with claim 5, further comprising the step of:

adding the weighted signals corresponding to the antenna elements to each other.

7. The signal processing method in accordance with claim 5, further comprising the step of:

subjecting the received signal received by each of the antenna elements to sampling, so as to convert the received signal to a digital signal.

8. The signal processing method in accordance with claim 7, wherein;

between the different timings, there is a difference of one sample time when the sampling frequency fs of the sampling is defined by:

$fs=4 \times f0/(2m+1)$ where m indicates a natural number, and f0 indicates die center frequency of the received signal.

* * * * *